US011516084B2

(12) United States Patent
Nelson et al.

(10) Patent No.: US 11,516,084 B2
(45) Date of Patent: Nov. 29, 2022

(54) DEVICE COMPATIBILITY IN A COMMUNICATION ARCHITECTURE

(71) Applicant: EMC IP Holding Company LLC, Hopkinton, MA (US)

(72) Inventors: Joshua Nelson, Gig Harbor, WA (US); Raymond Ramsden, Seattle, WA (US); Curtis Robert, Seattle, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 147 days.

(21) Appl. No.: 16/264,024

(22) Filed: Jan. 31, 2019

(65) Prior Publication Data

US 2020/0252289 A1  Aug. 6, 2020

(51) Int. Cl.
*H04L 41/0893* (2022.01)
*H04L 1/16* (2006.01)
*H04L 9/40* (2022.01)

(52) U.S. Cl.
CPC ........ *H04L 41/0893* (2013.01); *H04L 1/1607* (2013.01); *H04L 63/104* (2013.01)

(58) Field of Classification Search
CPC .................................................. H04L 41/0893
See application file for complete search history.

(56) References Cited

U.S. PATENT DOCUMENTS

| 9,652,732 | B1* | 5/2017 | Barstad | G06Q 30/06 |
| 10,375,077 | B1* | 8/2019 | Sokolov | G06F 21/6245 |
| 2014/0325361 | A1* | 10/2014 | Lee | G06Q 10/10 |
| | | | | 715/730 |
| 2017/0026282 | A1* | 1/2017 | Huang | H04W 8/005 |
| 2017/0099347 | A1* | 4/2017 | Pucha | H04L 63/101 |
| 2017/0223005 | A1* | 8/2017 | Birgisson | H04L 63/083 |
| 2017/0293613 | A1* | 10/2017 | Feng | G06F 9/5061 |
| 2018/0365131 | A1* | 12/2018 | Armitage | G06F 11/3664 |
| 2019/0014531 | A1* | 1/2019 | Fang | H04L 63/107 |
| 2019/0155577 | A1* | 5/2019 | Prabha | G06Q 10/0635 |
| 2020/0092166 | A1* | 3/2020 | Sharma | G06F 21/6218 |
| 2020/0162472 | A1* | 5/2020 | Zadeh | G06F 8/71 |

* cited by examiner

*Primary Examiner* — Nicholas R Taylor
*Assistant Examiner* — Sm Z Islam
(74) *Attorney, Agent, or Firm* — Amin, Turocy & Watson, LLP

(57) ABSTRACT

Facilitating device compatibility is provided herein. A system can comprise a processor and a memory that stores executable instructions that, when executed by the processor, facilitate performance of operations. The operations can comprise evaluating a parameter of a device to a defined parameter of a device pool based on receipt of a request to add the device to the device pool and based on a determination that a device type of the device does not match a defined device type of the device pool. Further, the operations can comprise either allowing the device to be included in the device pool based on the evaluating, or denying the device to be included in the device pool based on the evaluating. If the inclusion of the device is denied, the operations can comprise providing information indicative of a denial to add the device to the device pool.

20 Claims, 11 Drawing Sheets

DEVICE COMPATIBILITY IN A COMMUNICATION ARCHITECTURE

TECHNICAL FIELD

The subject disclosure relates generally to computing management systems. More specifically, the subject disclosure relates to a management system to facilitate compatibility among devices in a communication architecture.

BACKGROUND

Compatibility systems can attempt to map supported device types and varying hardware configurations to static categories of classes. In an example, a listing of classes already added to the cluster can be modified. Further, based on a compatibility list, devices can be integrated and/or provisioned (e.g., made ready for use), either separately or as groups, into a parallel distributed networked file system (e.g., OneFS). Additionally, the compatibility list can allow for increased degrees of control based on the widely varying hardware configurations within device classes. However, compatibility settings are not intuitive. For example, adding devices can sometimes end with unexplained results or with devices not provisioning into a parallel distributed networked file system as expected. In these cases, no feedback or explanation about the result is provided.

The above-described context with respect to conventional compatibility systems is merely intended to provide an overview of current technology, and is not intended to be exhaustive. Other contextual description, and corresponding benefits of some of the various non-limiting embodiments described herein, can become further apparent upon review of the following detailed description.

SUMMARY

The following presents a simplified summary of the disclosed subject matter to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In one embodiment, provided herein is a method that can comprise receiving, by a system comprising a processor, a request to add a device to a device pool where a device type of the device does not match a defined device type of the device pool. The method can also comprise evaluating, by the system, a parameter associated with the device and a defined setting associated with the device pool. Further, the method can comprise outputting, by the system, a first indication based on the parameter conforming to the defined setting (e.g., success related to adding a device to the device pool) and a second indication based on the parameter failing to conform to the defined setting (e.g., failure related to adding another device to the device pool).

In an implementation, the evaluation can comprise determining a restriction associated with adding the device to the device pool. Further to this implementation, the restriction can be a low-level restriction. The second indication can comprise an indication of differences between the parameter and the defined setting. The method further can comprise sending, by the system, an acknowledgement request associated with the differences. Further, the method can comprise allowing, by the system, the device to be added to the device pool based on a first receipt of a first confirmation in response to the acknowledgement request. Alternatively, the method can comprise denying, by the system, the device to be added to the device pool based on a second receipt of a denial of the acknowledgement request, or no response to the acknowledgement request.

According to an implementation the evaluation can comprise determining a hard restriction associated with adding the device to the device pool. The second indication can comprise an indication of the differences between the parameter and the defined setting. Further, the method can comprise denying, by the system, the device to be added to the device pool and outputting, by the system, the second indication that comprises a specific reason for denial to add the device to the device pool.

In accordance with some implementations, evaluating the first parameter can comprise evaluating historical data associated with at least a second device included in the device pool. Evaluating the first parameter can also comprise selectively allowing the first device to be added to the device pool based on a determination that the first parameter matches a second parameter of the second device.

In some implementations, evaluating the parameter can comprise evaluating historical data associated with at least a second device included in the device pool. Further, evaluating the parameter can comprise selectively allowing the first device to be added to the device pool based on a determination that the first device type matches a second device type of the second device.

According to some implementations, the method can comprise defining, by the system, one or more restrictions related to addition of devices to the device pool. The one or more restrictions can be based on a performance level of the device pool satisfying a defined performance level after the addition of the devices to the device pool. Further to these implementations, the method can comprise allowing, by the system, the addition of a first device of the devices to the device pool based on the performance level satisfying the defined performance level after the addition of the first device. The method can also comprise denying, by the system, the addition of a second device of the devices to the device pool based on the performance level failing to satisfy the defined performance level after the addition of the second device.

In accordance with some implementations, the method can comprise defining, by the system, one or more restrictions related to addition of devices to the device pool. The one or more restrictions can be based on a reliability threshold of the device pool satisfying a defined reliability threshold based on the addition of the devices to the device pool. Further to these implementations, the method can comprise allowing, by the system, the addition of a first device to the device pool based on the reliability threshold satisfying the defined reliability threshold after the addition of the first device. The method can also comprise denying, by the system, the addition of a second device to the device pool based on the reliability threshold failing to satisfy the defined reliability threshold after the addition of the second device.

Another embodiment relates to a system that can comprise a processor and a memory that stores executable instructions that, when executed by the processor, facilitate performance of operations. The operations can comprise evaluating a parameter of a device to a defined parameter of a device pool based on receipt of a request to add the device to the device pool and based on a determination that a device type of the device does not match a defined device type of the device pool. Further, the operations can comprise either allowing the device to be included in the device pool based on the evaluation or denying the device to be included in the device pool based on the evaluation. If the inclusion of the device is denied, the operations can comprise providing information indicative of a denial to add the device to the device pool. According to some implementations, providing the information indicative of the denial can comprise providing the information at a defined level of specificity.

In some implementations, the operations can comprise performing a health check for a cluster configuration of the device pool. The health check can comprise assessing one or more restrictions associated with a group of devices in the device pool. The operations can also comprise changing the cluster configuration of the device pool based on a first determination that a performance level of the device pool is below a defined performance level or a second determination that a reliability level of the device pool is below a defined reliability level. Further to these implementations, the device pool can be a first device pool and changing the cluster configuration of the device pool can comprise moving one or more devices of the group of devices to a second device pool.

In accordance with some implementations, the operations can comprise performing a health check for a cluster configuration of the device pool. Performing the health check can comprise assessing one or more restrictions associated with a group of devices in the device pool. In addition, performing the health check can comprise outputting an alert and an action to be performed to correct the cluster configuration based on a determination that a reliability of the cluster configuration has fallen below a defined reliability level or that a performance of the cluster configuration has fallen blow a defined performance level.

In some implementations, the operations can comprise evaluating historical data associated with at least a second device included in the device pool. The operations can also comprise selectively allowing the first device to be added to the device pool based on a determination that a first parameter matches a second parameter of the second device.

The operations can comprise, according to some implementations, defining one or more restrictions related to addition of devices to the device pool. The one or more restrictions can be based on a performance level of the device pool satisfying a defined performance level based on the addition of the devices to the device pool. The operations can also comprise allowing the addition of a first device to the device pool based on the performance level satisfying the defined performance level after the addition of the first device. Further, the operations can comprise denying the addition of a second device to the device pool based on the performance level failing to satisfy the defined performance level after the addition of the second device. Accordingly, the first device can be added to the pool while the second device is not added to the pool.

Another embodiment relates to a computer-readable storage medium comprising instructions that, in response to execution, cause a system comprising a processor to perform operations. The operations can comprise comparing a first parameter associated with a first device requested to be added to a device pool with a second parameter associated with a second device included in the device pool. The operations can also comprise allowing the first device to be added to the device pool based on the first parameter matching the second parameter. Alternatively, the operations can comprise denying the first device to be added to the device pool based on the first parameter failing to match the second parameter and providing a message of denial in response to a request for the first device to be added to the device pool. The message of denial can comprise specific details related to the denial to add the device to the device pool.

In some implementations, the operations can comprise defining one or more restrictions related to addition of devices to the device pool. The one or more restrictions can be based on a performance level of the device pool continuing to satisfy a defined performance level after addition of the first device or based on a reliability level of the device pool continuing to satisfy a defined reliability level after addition of the first device.

According to some implementations, the one or more restrictions can comprise a low-level restriction and a high-level restriction. The addition of the first device to the device pool can be allowed after acknowledgement of the low-level restriction. Further, the addition of the first device to the device pool is not allowed based on the high-level restriction.

To the accomplishment of the foregoing and related ends, the disclosed subject matter comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description can include additional or alternative embodiments beyond those described in this summary.

BRIEF DESCRIPTION OF THE DRAWINGS

Various non-limiting embodiments are further described with reference to the accompanying drawings in which.

DETAILED DESCRIPTION

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details. In other instances, well-known structures and devices are shown in block diagram form in order to facilitate describing the various embodiments.

The term "device" as utilized herein refers to, but is not limited to, a single server, a single server comprising two or more drives and/or network cards, two or more servers comprising two or more drives and/or network cards, storage, a chassis comprising one or more drives, a chassis comprising storage (including flash storage), a computer, a chassis communicatively coupled to a computer, one or more servers connected to at least one chassis comprising one or more drives, a node connected to multiple storage chassis, a device communicatively coupled to one or more sub-devices, and so on.

As discussed, various compatibility approaches can result in devices not being added to a device pool without an explanation being provided. The one or more embodiments provided herein can address this situation by the implementation of direct control of the integration of a device type. Instead of setting a compatibility flag and checking what changes occurred on the cluster, the disclosed embodiments can allow for the selection of a device type and the ability to directly join the device to the desired pool. A device pool, or simply pool, is a collection of devices that are on a cluster. The action will either succeed, or, if not successful, an explanation as to exactly what rule-based restriction is preventing the action from success can be provided. In some cases, the restriction message can be overridden with an approval confirmation. This approach allows direct control and feedback of a simple desired action.

Figure 1:
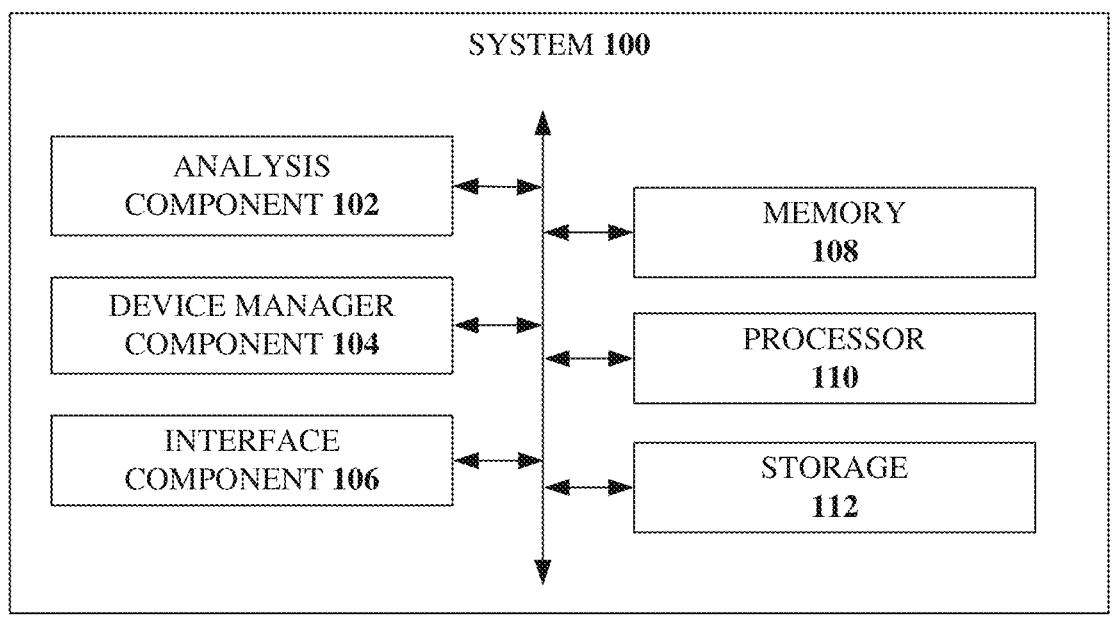
FIG. 1 illustrates an example, non-limiting, system for facilitating device compatibility in a communication architecture in accordance with one or more embodiments described herein.

FIG. 1 illustrates an example, non-limiting, system 100 for facilitating device compatibility in a communication architecture in accordance with one or more embodiments described herein. The system 100 can include an analysis component 102, a device manager component 104, an interface component 106, at least one memory 108, at least one processor 110, and at least one storage device 112.

Continuing advances in hardware and the increasing demands of parallel distributed networked file systems (e.g., OneFS) can create a requirement for a system which can provide continuing integration of new hardware into existing parallel distributed networked file system clusters. The various aspects provided herein can solve the integration and management of new and varying device hardware types into a parallel distributed networked file system (e.g., a communication architecture) by providing an intuitive system that can evaluate and provide descriptive rule-based restrictions and feedback in order to optimize device configurations based on reliability and performance of the parallel distributed networked file system.

The embodiments provided herein can be designed as an intuitive control for integrating device types into a parallel distributed networked file system. In an example, a device can be a storage product that comprises nodes which connect to multiple drive chassis, and the drive chassis need to be compatible (e.g., of a same or similar device type). When a device is added to a parallel distributed networked file system cluster, the device can be added to a device pool automatically. If the device type is unique, such that the hardware profile is different from any device already joined to the cluster, the device will join a new separate device pool. The disclosed aspects can provide the functionality of being able to select the device type and join it to a selected device pool. If the action of joining the device type to the device pool encounters a restriction, a message can be presented explaining exactly the reason for failing, confirmation of the restriction, and/or suggestions to overcome the restriction. The control to join a device type to a specific device pool, the underlying rule-based comparisons, and the message response system will be discussed in further detail below.

When the action of merging a device type into a device pool is requested, the underlying rule-based system for evaluating the action can be engaged. The state of the current pool configuration can be evaluated, then the action can be performed, the new configuration can be evaluated again, and the two can be compared to determine the result. The evaluation can compare device types and pool settings. These comparisons can be implemented as rule-based restrictions, which can help to optimize the reliability and performance of cluster pool configuration. If the action were to make a change that violates a rule, a restriction can be created which can track that instance of the rule violation. If no restrictions are created, the action can be performed, and the configuration can be saved (e.g., as historical data). If one or more restrictions are created, the restrictions can be presented as message responses to the action in order to explain the result.

The restriction system discussed herein can provide at least two levels of restrictions. High-level restrictions (e.g., hard restrictions) are encountered rules that prevent a requested action from succeeding. Low-level restrictions (e.g., soft restrictions) are rules that require a message to be displayed and then confirmed in order to complete the action. Restrictions can occur as a comparison between two device types, or a device type and a device pool. Pool restrictions can occur when a device pool setting does not allow a device type with a hardware configuration (or other type of configuration) to be added to the device pool unless the setting is modified. Device type restrictions are generally rules based on differences in hardware that are enforced to create optimal performance and reliability of the parallel distributed networked file system cluster.

The restriction system also can act as a health check for the cluster configuration. The currently active restrictions can be assessed to determine if any changes can be made to optimize performance and reliability of the cluster. Alternatively, if an invalid configuration exists, an alert and information on how to correct the configuration can be provided.

With continuing reference to FIG. 1, the analysis component 102 can be configured to evaluate at least one parameter of a device (or more than one device). The evaluation by the analysis component 102 can be performed based on receipt of a request (e.g., via the interface component 106) to add the device to a device pool. Upon or after the request, the device can be determined to comprise a device type that does not match a defined device type of the device pool. The defined device type can be pre-defined for the pool and/or defined based on historical data associated with the device pool.

Based on the evaluation by the analysis component 102, the device manager component 104 can be configured to selectively allow the device to be added to the device pool or can deny the addition of the device to the device pool. For example, the device manager component 104 can allow inclusion of the device in the device pool based on a determination, by the analysis component 102, that the parameter of the device conforms to the defined device type. In another example, the device manager component 104 can allow inclusion of the device in the device pool based on a determination, by the analysis component 102, that the parameter of the device does not conform to the defined device type.

In some implementations, the analysis component 102 can perform an underlying rules-based comparison. To perform the rules-based comparison, the analysis component 102 can evaluate the active rules that exist on the cluster. For example, there are two devices on the same pool with a low-level restriction that was previously approved based on a previous addition of a device to that pool (e.g., there was a difference in memory between two devices, which would result in a performance implication). However, it was determined that the compatibility of the devices being in the same pool outweighed the performance implication and the devices were added to the same pool. Accordingly, there can be an active rule that can execute each time the analysis component 102 evaluates a state of a cluster and a notice of the previously overridden (e.g., approved) low-level restriction can be provided.

The system 100, prior to making the change, can evaluate the state of the cluster, make the change, and evaluate the final state of the cluster. The state of the cluster before the change can be compared to the state of the cluster after the change to determine which rules have changed, which rules have been added, and so on. Based on this, a response can be output by the interface component 106 providing information related to the changes, as well as any confirmation that might need to be approved. Thus, the rule-based system (e.g., the system 100) can be used to make the evaluation between different devices, analyze the hardware, and evaluate the state of the cluster.

In an example, different device types (or device classes) can be categorized based on the hardware of the device and/or the configuration of the hardware. Configurations can allow for flags to be set such that if a first device is compatible with a second device, the flag is set so that the devices are placed together in a device pool. If the first device has its flag set to a first setting, and a second device has its flag set to a second setting, the devices would be placed in different device pools. However, a problem with this type of automatic flag setting can be that information (e.g., an explanation) is not provided as to why the first device and the second device are not grouped in the same pool (e.g., based on the flag settings). To overcome this situation, the interface component 106 can provide an output that indicates the differences in the flag settings and, if appropriate, one or more actions that can be taken in order for the first device and the second device to be placed in the same device pool.

Further, there can be a number of configurations that can be established in order for devices to be compatible. For example, there can be an automatic rule that indicates if there is a device with 48 Gigabits (GBs) of Random Access Memory (RAM), the device can be automatically be placed in a same pool with another device with 64 GBs of RAM. These settings can be exposed by the interface component 106 and can be selectively changed and/or the information can be utilized to determine why the two devices were assigned to the same device pool (and can be split into different pools, as desired).

Further, the interface component 106 can provide information indicative of a denial to add the device to the device pool. For example, the information can be provided at a defined level of specificity (e.g., based on user configurable settings). Accordingly, such feedback provided by the interface component 106 can be information related to the success or failure of grouping devices in a device pool. If there is a failure, specific reasons related to the failure, and recommendations for changing one or more settings to remove the failure and allow the devices to be grouped together can be rendered. In another example, information related to concerns, such as reliability and/or performance issues that might arise when two or more types of devices are grouped can be provided with the disclosed aspects. This can allow for the distribution of information and the ability to have a wider range of configurations while also providing information about the choices being made while grouping devices.

The at least one memory 108 can be operatively coupled to the at least one processor 110. The at least one memory 108 can store protocols associated with facilitating not compatibility as discussed herein. Further, the at least one memory 108 can facilitate actions to control communication, such that the system 100 can employ stored protocols and/or algorithms to achieve improved device compatibility as described herein.

It should be appreciated that data store components (e.g., memories) described herein can be either volatile memory, nonvolatile memory, or can include both volatile and nonvolatile memory. By way of example and not limitation, nonvolatile memory can include Read Only Memory (ROM), Programmable ROM (PROM), Electrically Programmable ROM (EPROM), Electrically Erasable ROM (EEPROM), or flash memory. Volatile memory can include Random Access Memory (RAM), which acts as external cache memory. By way of example and not limitation, RAM is available in many forms such as synchronous RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 110 can facilitate processing data related to compatibility of devices as discussed herein. The at least one processor 110 can be a processor dedicated to analyzing and/or generating information received, a processor that controls one or more components of the system 100, and/or a processor that both analyzes and generates information received and controls one or more components of the system 100.

Figure 2:
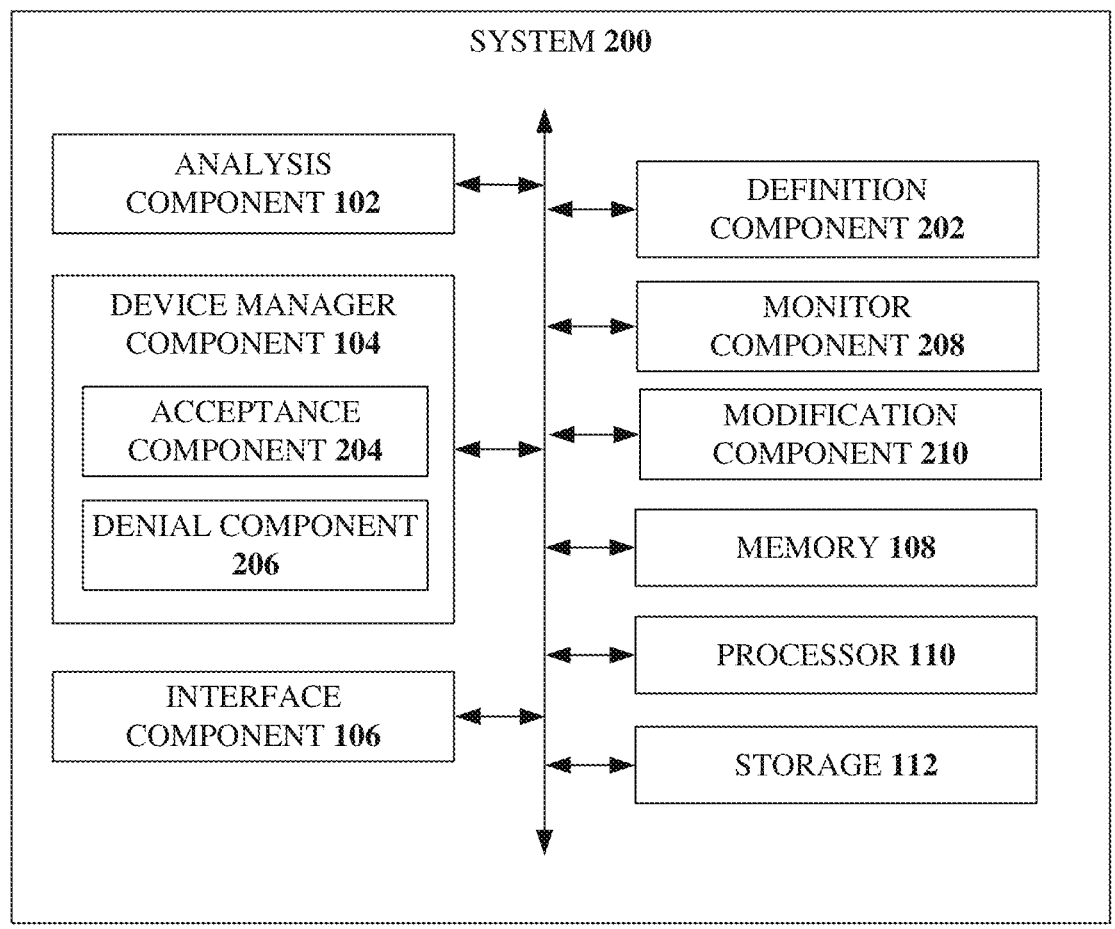
FIG. 2 illustrates another example, non-limiting, system for facilitating device compatibility related to adding devices to a device pool in accordance with one or more embodiments described herein.

FIG. 2 illustrates another example, non-limiting, system 200 for facilitating device compatibility related to adding devices to a device pool in accordance with one or more embodiments described herein. Repetitive description of like elements employed in other embodiments described herein is omitted for sake of brevity. The system 200 can comprise one or more of the components and/or functionality of the system 100, and vice versa.

The system 200 can comprise a definition component 202 that can be configured to define one or more restrictions related to the addition of devices to a device pool. For example, the one or more restrictions can be based on a performance level of the pool satisfying a defined performance level based on the addition of one or more devices to the device pool. Thus, if the performance level of the device pool is expected to satisfy the defined performance level after addition of a device, an acceptance component 204 can selectively allow that device to be added to the device pool. Alternatively, if the performance level of the device pool is expected to no longer satisfy the defined performance level after addition of a device, a denial component 206 can selectively deny addition of that device to the device pool.

In another example, the one or more restrictions can be based on a reliability of the pool satisfying a defined reliability threshold based on the addition of one or more devices to the device pool. Thus, if a reliability of the device pool is expected to satisfy the defined reliability threshold after addition of a device, the acceptance component 204 can selectively allow that device to be added to the device pool. Alternatively, if the reliability of the device pool is expected to no longer satisfy the defined reliability threshold after addition of a device, the denial component 206 can selectively deny addition of that device to the device pool.

In an example, the device manager component 104 can evaluate what a cluster looks like in terms of devices in relation to other devices. The device manager component 104 (or the acceptance component 204) can join the devices to the pool and evaluate what has changed, if anything. For example, there is a pool that comprises three devices, each having 48 GBs of RAM. A new device with 64 GBs of RAM is selected to be added to the pool. The analysis component 102 can determine that the original three devices are identical to one another and the device manager component 104 can determine that there are no rules and/or restrictions against them, but that the fourth device has a different hardware configuration and that there is a restriction between the fourth device and the original three devices. According to some implementations, the definition component 202 can establish a rule or restriction based on that difference. Accordingly, other devices having 64 GBs can be added to the device pool.

Depending on the rule/restriction created by the definition component 202, the change (e.g., adding a device to a pool), can be allowed to happen without a warning (e.g., no restriction) or with a click through confirmation (e.g., a low-level restriction). In another example, a warning can be added that is specific to the change (e.g., "The device added has more RAM, which may affect he performance of the pool. Confirm this is okay?") In another example, it could be determined that the memory size (e.g., the RAM) is so different that it will impact the performance of the pool in such a negative way that the definition component 202 does not allow the change to occur (e.g., high-level restriction). It is noted that although various aspects are discussed herein with respect to memory or RAM size, the disclosed aspects are not limited to this implementation and other factors can be considered with respect to compatibility of devices. For example, the other factors can include the amount of memory, the amount of RAM, the SSDs, the types of adapters, the types of backends, the number of drives, and so on. It is also noted that the factors to be considered are not limited to physical attributes and can include, for example, a software update.

In some implementations, the request received (e.g., via the interface component 106) can be that there are two (or more) devices that should be compatible. The system 200 can automatically indicate whether it is allowable or not allowable. For example, if it is not a setting established by default, the setting can be overwritten. In an example, the request can indicate that a first set of five devices should be placed in a same pool with a second set of five devices. Thus, the system 200 can determine if there are any concerns related to merging and bringing the devices together in a same pool and can allow or deny the addition of one or more device of the second set of five devices.

According to some implementations, a first set of restrictions can be preconfigured while a second set of restrictions are not preconfigured. The restrictions are rules determined based on performance testing. According to some implementations, the restrictions can be parallel distributed networked file system code restrictions that can prevent certain devices from being added to the same pool as other devices.

In a specific non-limiting example, a rule or restriction can be related to the number of drives in a device. Thus, in order to have the devices together, the devices should have the same number of hard drives. This rule or restriction can be derived by the files on the cluster being protected. Therefore, unless the file layout is changed, the rule or restriction can be enforced without allowing an override of that rule/restriction based on the protection level assigned to the cluster.

In another non-limiting example, a high-level restriction could be that devices should have the same number of bits. Therefore, a device that has 24 bits and a device that has 36 bits cannot belong to the same pool. Since it is a high-level restriction, it cannot be overridden. Accordingly, an output can be provided, via the interface component 106, that provides specific information related to why the devices cannot be joined (e.g., a different number of bits). Thus, feedback information is provided as compared to systems that do not allow the devices to be joined, but also do not provided any feedback related to the non-joinder of devices.

The feedback information can be utilized to change an incorrect setting on a cluster. In another example, the feedback information can be utilized to determine if a new device has been provided with incorrect hardware, which can be corrected in order for the device to the added.

According to some implementations, at least some of the compatibility settings can be dependent on software settings on the cluster and/or how a user has configured the cluster. For example, there can be user configured settings on the cluster that can be edited in order for the devices to be compatible. The information related to the edits that should be made can be provided in the feedback data output by the interface component 106. For example, a low-level restriction message can be configured to indicate the setting and how to change the setting in order for the device to be compatible.

In a non-liming example related to L3 settings, there can be a set of devices with one solid state drive and another set of devices with two solid state drives. In this situation, the L3 setting should be enabled in order for the sets of devices to be merged together. If the setting is not enabled and the request for the sets of devices to be compatible is received, the interface component 106 can output a low-level restriction that provides the information related to the setting and, optionally, how to change the setting.

According to a non-limiting example, a low-level restriction was related to the size of memory and a confirmation was received that it is acceptable to join devices that comprise 48 GB with devices that comprise 64 GB. Thus, if another device having either 48 GB or 64 GB is to be added to the same device, the device can be automatically joined based on the historical information (e.g., the confirmation). However, if a device having a different memory size is requested to be added to the pool, although it is a same category of rule (e.g., memory size), the impact to the pool can be evaluated and a low-level restriction can be applied and approval for the change acknowledged prior to that device being added to the pool. Thus, if a device having 128 GB is to be added, there can be a first rule between the 48 GB and the 128 GB applied and a second rule between the 64 GB and the 128 GB applied.

Additionally, or alternatively, the system 200 can comprise a monitor component 208 that can be configured to perform a health check for a cluster configuration of the device pool. The monitor component 208 can perform the health assessment periodically, based on defined intervals, aperiodically, or at other times. According to some implementations, the monitor component 208 can perform an evaluation on the status of the cluster and determine which rules/restrictions have been overridden., which represent compromises made that could affect reliability or the performance of a cluster.

In a non-limiting example, there is an issue in a previous installment of the compatibility system. In this example, a hardware upgrade was performed on the cluster where memory was manually swapped, and/or new memory added and a request to refresh the compatible system was received. The monitor component 208 can determine which devices were changed and evaluate the current status to determine if there are now any high-level restrictions/rules that apply. If so, the monitor component 208 (e.g., via the interface component 106) can output feedback indicating that the devices should not be allowed together but, for some reason, they have been allowed together. This can be utilized as a health check to determine if something needs to be fixed, although it might not be clear how the situation arose, but the system is not going to simply crash but will provide the opportunity to correct the situation. Thus, high-level restrictions should be fixed as soon as possible. Low-level restrictions could arrive due to performance implications because of the rule and can use that to improve the performance in the future (e.g., splitting devices from a device pool). Thus, the monitor component 208 can be continuously (or based on another interval) evaluating the devices to determine if anything has changed based on current rules.

For example, the monitor component 208 can assess one or more restrictions associated with a group of devices in the device pool. If the monitor component 208 determines that a performance level and/or a reliability level of the device pool is below the defined performance level and/or the defined reliability threshold, a modification component 210 can change the cluster configuration of the device pool.

In an example, the device pool comprises five devices and, based on a health check assessment performed by the monitor component 208, it is determined that the reliability level of the device pool has fallen below the defined reliability threshold. Therefore, the modification component 210 can select a device from the group of five devices and move the selected device to another device pool. The monitor component 208 can perform another analysis and, if the device pool continues to fail to satisfy the defined reliability threshold, the modification component 210 can select another device from the group (that now comprises four devices) and move the selected device to the device pool to which the first selected device was placed, or to a different device pool. Another assessment can be performed by the monitor component 208 and further modifications can be made, if necessary.

The restrictions or the rule-based comparisons can be subject to change and can be designed in such a way that the rules/restrictions can be easy to modify. In a non-limiting example, if the rules/restrictions are based on the software version, the rules/restrictions could be updated based on a configuration file. In another example, if there is a new hardware device, performance testing can be executed and it can be determined that there is a performance problem, therefore, the rules/restrictions can be tightened, and the changes can be pushed out to the system. Alternatively, if it is determined that a performance problem does not exist, the rules/restrictions can be loosened and pushed out to the system. Thus, the rules-based restrictions can be easily modified and can adjust how the devices are grouped depending on what is appropriate for performance and/or reliability.

In some cases, a low-level restriction can be changed to a high-level restriction and vice versa. In a non-limiting example, there can be a large performance impact due to differences in Ethernet ports, resulting in a low-level restriction being changed to a high-level restriction (after the devices have been joined in the same pool). Thus, when a cluster is updated to a new rule set, a health check can be performed (e.g., by the monitor component 208). It can be determined that although the differences in the Ethernet ports were originally a low-level restriction, it is now a high-level restriction and a message can be output via the interface component. The message can indicate that the two configurations of hardware should not be together due to performance reasons, for example, and information related to correcting the situation can be provided in the message.

In some implementations, the monitor component 208 can facilitate one or more changes to a device pool in order to increase reliability and/or performance. For example, a hardware update could have changed a revision level from an X700 to an X705, which are nearly identical except for some small hardware details. For grouping of devices, it could be acceptable to group or pair the X700 revision level devices with the X705 revision level devices. However, in the future, it might be determined that reliability and/or performance could be improved if devices having those different revision levels are not in the same pool. Thus, the monitor component 208 can determine this change should be made and the devices can be automatically divided into two device pools, or could be divided after receipt of a confirmation to a message indicating the suggestion change is received.

According to some implementations, manual device pools can be created. For example, if there are devices of the same type in a single device pool, one or more of the devices can be moved to another device pool. Such splitting or separation of devices can be facilitated via the interface component 106 or another system component.

According to some implementations, the interface component 106 (as well as other interface components discussed herein) can provide a Graphical User Interface (GUI), a command line interface, a speech interface, Natural Language text interface, and the like. For example, a GUI can be rendered that provides an entity with a region or means to load, import, select, read, and so forth, various requests and can include a region to present the results of the various requests. These regions can include known text and/or graphic regions that include dialogue boxes, static controls, drop-down-menus, list boxes, pop-up menus, as edit controls, combo boxes, radio buttons, check boxes, push buttons, graphic boxes, and so on. In addition, utilities to facilitate the information conveyance, such as vertical and/or horizontal scroll bars for navigation and toolbar buttons to determine whether a region will be viewable, can be employed. Thus, it might be inferred that the entity did want the action performed.

The entity can also interact with the regions to select and provide information through various devices such as a mouse, a roller ball, a keypad, a keyboard, a pen, gestures captured with a camera, a touch screen, and/or voice activation, for example. According to an aspect, a mechanism, such as a push button or the enter key on the keyboard, can be employed subsequent to entering the information in order to initiate information conveyance. However, it is to be appreciated that the disclosed aspects are not so limited. For example, merely highlighting a check box can initiate information conveyance. In another example, a command line interface can be employed. For example, the command line interface can prompt the entity for information by providing a text message, producing an audio tone, or the like. The entity can then provide suitable information, such as alpha-numeric input corresponding to an option provided in the interface prompt or an answer to a question posed in the prompt. It is to be appreciated that the command line interface can be employed in connection with a GUI and/or Application Program Interface (API). In addition, the command line interface can be employed in connection with hardware (e.g., video cards) and/or displays (e.g., black and white, and Video Graphics Array (VGA)) with limited graphic support, and/or low bandwidth communication channels.

Figure 3:
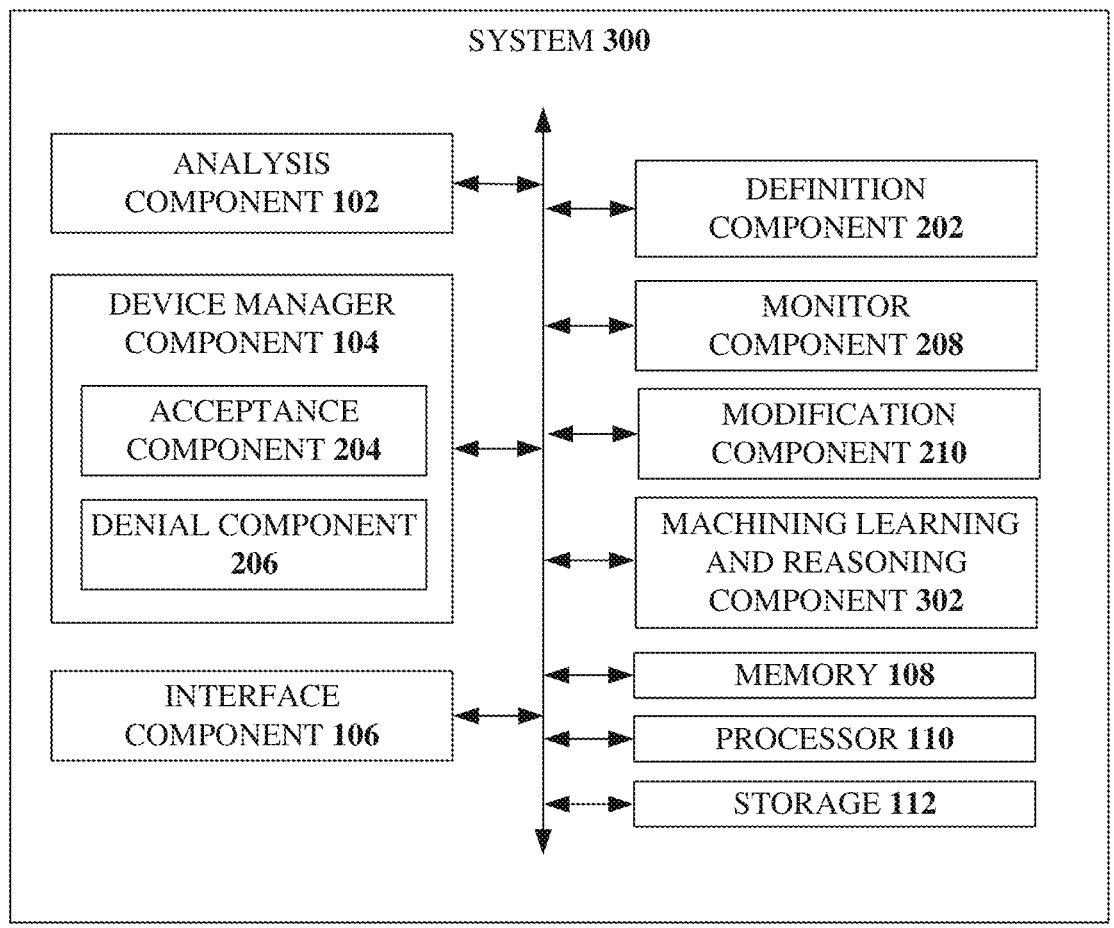
FIG. 3 illustrates an example, non-limiting, system that employs automated learning to facilitate one or more of the disclosed aspects in accordance with one or more embodiments described herein.

FIG. 3 illustrates an example, non-limiting, system 300 that employs automated learning to facilitate one or more of the disclosed aspects in accordance with one or more embodiments described herein. Repetitive description of like elements employed in other embodiments described herein is omitted for sake of brevity. The system 300 can comprise one or more of the components and/or functionality of the system 300 and vice versa.

As illustrated, the system 300 can comprise a machine learning and reasoning component 302 that can be utilized to automate one or more of the disclosed aspects. The machine learning and reasoning component 302 can employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component 302 can employ principles of probabilistic and decision theoretic inference. Additionally, or alternatively, the machine learning and reasoning component 302 can rely on predictive models constructed using machine learning and/or automated learning procedures. Logic-centric inference can also be employed separately or in conjunction with probabilistic methods.

The machine learning and reasoning component 302 can infer whether one or more devices are compatible or could be compatible based on a setting change or another minor alteration without impacting reliability and/or performance of a device pool by obtaining knowledge about historical information of the device pool or similar device pools, low-level restrictions overridden and/or acknowledged for the same device pool or similar device pools. Based on this knowledge, the machine learning and reasoning component 302 can make an inference based on which devices are compatible, which low-level restrictions can be dynamically ignored or overridden, which devices are compatible and can be combined, or combinations thereof.

As used herein, the term "inference" refers generally to the process of reasoning about or inferring states of a system, a component, a module, an environment, and/or devices from a set of observations as captured through events, reports, data and/or through other forms of communication. Inference can be employed to identify compatibility of devices, or can generate a probability distribution over states, for example. The inference can be probabilistic. For example, computation of a probability distribution over states of interest based on a consideration of data and/or events. The inference can also refer to techniques employed for composing higher-level events from a set of events and/or data. Such inference can result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects.

If the machine learning and reasoning component 302 has uncertainty related to the intent or request, the machine learning and reasoning component 302 can automatically engage in a short (or long) dialogue or interaction with the user (e.g., "Is this acceptable?"). In accordance with some aspects, the machine learning and reasoning component 302 engages in the dialogue with the user through another system component. Computations of the value of information can be employed to drive the asking of questions. Alternatively, or additionally, a cognitive agent component (not shown) and/or the machine learning and reasoning component can anticipate an action (e.g., "are these two devices compatible?") and continually, periodically, or based on another interval, update a hypothesis as more user actions are gathered. The cognitive agent component can accumulate data or perform other actions that are a result of anticipation of the user's future actions.

The various aspects (e.g., in connection with determining if devices are compatible, changing one or more settings or other parameters to make two devices compatible, performing a health check to ensure continuing compliance with low-level and/or high-level restrictions) can employ various artificial intelligence-based schemes for carrying out various aspects thereof. For example, a process for determining if a particular action violates a restriction can be enabled through an automatic classifier system and process.

A classifier is a function that maps an input attribute vector, $x=(x1, x2, x3, x4, xn)$, to a confidence that the input belongs to a class. In other words, $f(x)=confidence(class)$. Such classification can employ a probabilistic and/or statistical-based analysis (e.g., factoring into the analysis utilities and costs) to provide a prognosis and/or infer one or more actions that should be employed to determine compatibility of devices to be automatically performed.

A Support Vector Machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and probabilistic classification models) providing different patterns of independence can be employed. Classification as used herein, can be inclusive of statistical regression that is utilized to develop models of priority.

One or more aspects can employ classifiers that are explicitly trained (e.g., through a generic training data) as well as classifiers that are implicitly trained (e.g., by observing device behavior, by receiving extrinsic information, and so on). For example, SVM's can be configured through a learning or training phase within a classifier constructor and feature selection module. Thus, a classifier(s) can be used to automatically learn and perform a number of functions, including but not limited to determining, according to a predetermined criterion, when to automatically override a low-level restriction, which devices to group together, which devices to separate in order to increase performance and/or reliability, and so forth. The criteria can include, but is not limited to, similar responses to low-level restrictions, historical information, and so forth.

Additionally, or alternatively, an implementation scheme (e.g., a rule, a policy, and so on) can be applied to control and/or regulate device compatibility and resulting actions, inclusion of a group of devices based on reliability and/or performance requirements, and so forth. In some implementations, based upon a predefined criterion, the rules-based implementation can automatically and/or dynamically interpret requests for device compatibility. In response thereto, the rule-based implementation can automatically interpret and carry out functions associated with the request by employing a predefined and/or programmed rule(s) based upon any desired criteria.

Methods that can be implemented in accordance with the disclosed subject matter, will be better appreciated with reference to the following flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 4:
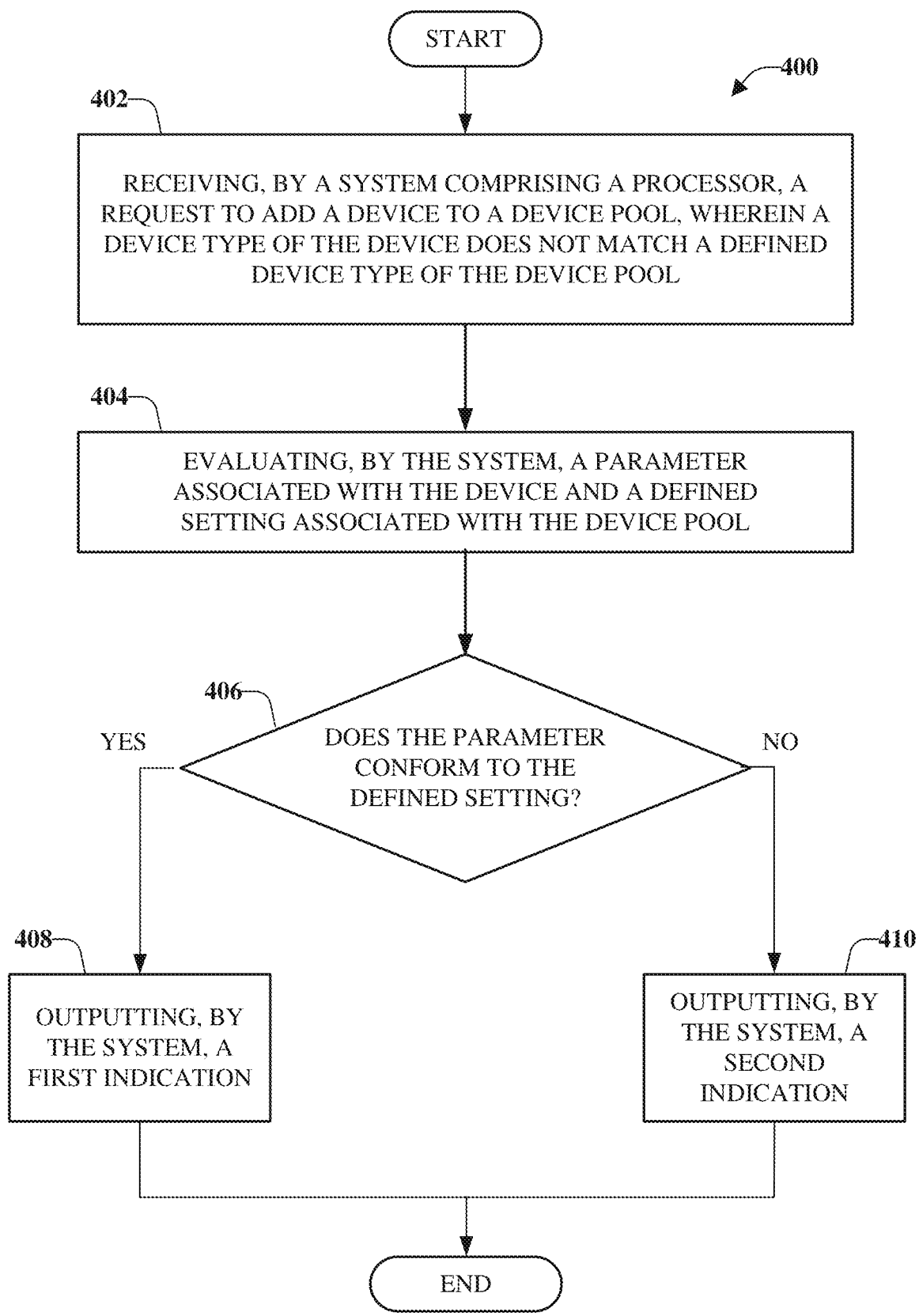
FIG. 4 illustrates a flow diagram of an example, non-limiting, computer-implemented method that facilitates device compatibility in accordance with one or more embodiments described herein.

FIG. 4 illustrates a flow diagram of an example, non-limiting, computer-implemented method 400 that facilitates device compatibility in accordance with one or more embodiments described herein. Repetitive description of like elements employed in other embodiments described herein is omitted for sake of brevity.

In some implementations, a system comprising a processor can perform the computer-implemented method 400 and/or other methods discussed herein. In other implementations, a device comprising a processor can perform the computer-implemented method 400 and/or other methods discussed herein. In other implementations, a machine-readable storage medium, can comprise executable instructions that, when executed by a processor, facilitate performance of operations, which can be the operations discussed with respect to the computer-implemented method 400 and/or other methods discussed herein. In further implementations, a computer readable storage device comprising executable instructions that, in response to execution, cause a system comprising a processor to perform operations, which can be operations discussed with respect to the computer-implemented method 400 and/or other methods discussed herein.

At 402 of computer-implemented method 400, a system operatively coupled to one or more processors, can receive a request to add a device to a device pool (e.g., via the interface component 106). For example, the request can be received from an entity. As utilized herein an entity can be one or more computers, the Internet, one or more systems, one or more commercial enterprises, one or more computers, one or more computer programs, one or more machines, machinery, one or more actors, one or more users, one or more customers, one or more humans, and so forth, hereinafter referred to as an entity or entities depending on the context.

At 404, the system can evaluate a parameter associated with the device and a defined setting associated with the device pool (e.g., via the analysis component 102). The parameter can relate to a rule, a policy, and/or a restriction. For example, a restriction can be a first-type of restriction and at least a second-type of restriction. The first-type of restriction can be a restriction that can be overridden based on acknowledgement of the reason for the restriction. The second-type of restriction can be a restriction that cannot be overridden, but for which a subsequent change is needed.

Further, at 406, a determination can be made whether the parameter conforms to the defined setting (e.g., via the device manager component 104). If the parameter is determined to conform to the defined setting (e.g., a positive response to the determination at 406), at 408, the system can output a first indication (e.g., via the acceptance component 204 and/or the interface component 106).

Alternatively, if the parameter is determined not to conform to the defined setting (e.g., a negative response to the determination at 406), the system can output a second indication at 410 (e.g., via the denial component 206 and/or the interface component 106). The second indication can comprise, for example, an acknowledgment of the differences between the parameter and the defined setting (e.g., the first type of restriction).

Figure 5:
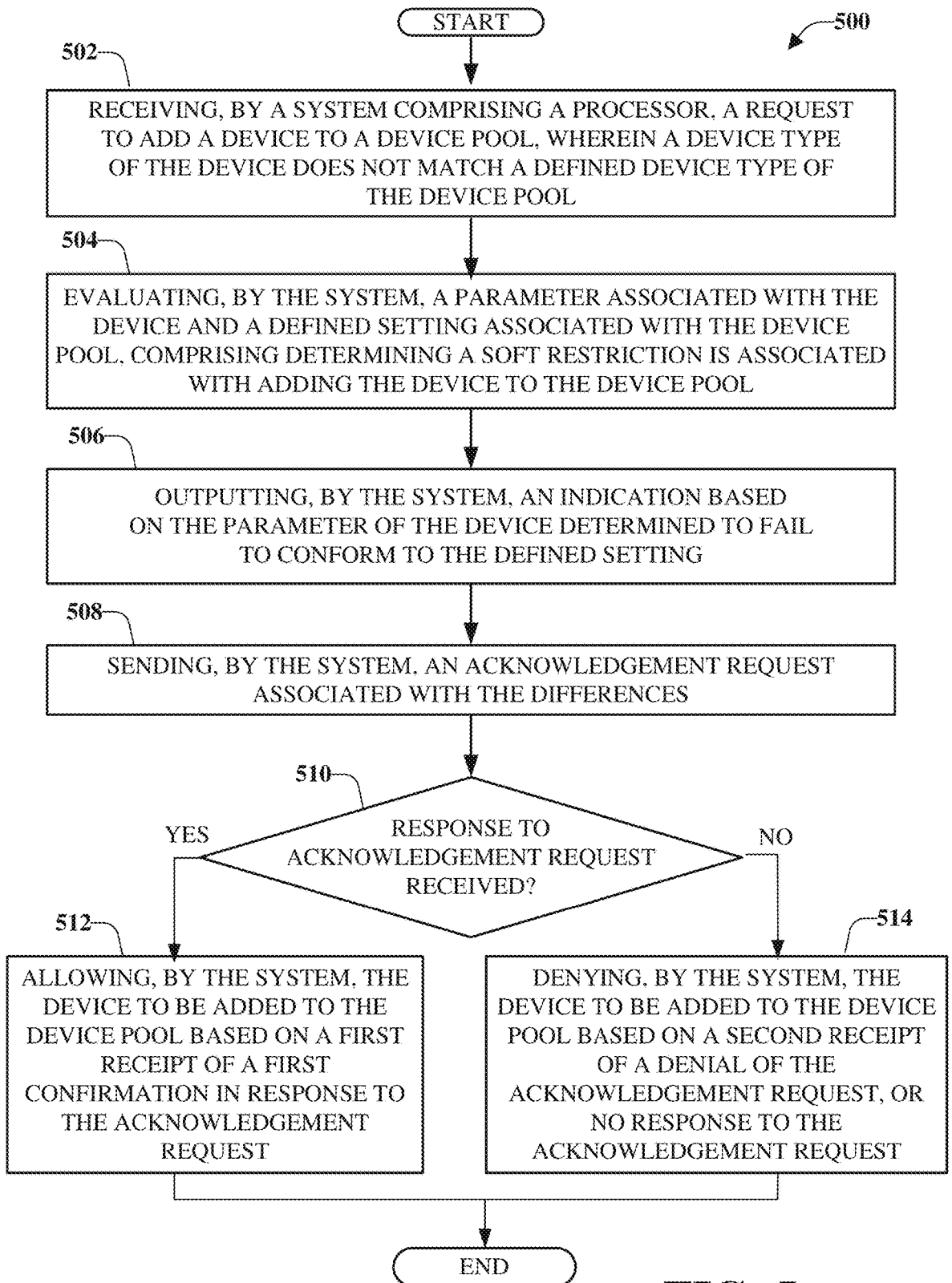
FIG. 5 illustrates a flow diagram of an example, non-limiting, computer-implemented method that facilitates implementation of a low-level restriction related to device compatibility in accordance with one or more embodiments described herein.

FIG. 5 illustrates a flow diagram of an example, non-limiting, computer-implemented method 500 that facilitates implementation of a low-level restriction related to device compatibility in accordance with one or more embodiments described herein. Repetitive description of like elements employed in other embodiments described herein is omitted for sake of brevity.

At 502, at least one request to add a device to a device pool can be received (e.g., via the interface component 106).

The request can be, for example, to add a device that has a device type which does not match a defined device type of the device pool. At 504, a parameter associated with the device and a defined setting associated with the device pool can be evaluated (e.g., via the analysis component 102). This evaluation can comprise determining a low-level restriction is associated with adding the device to the device pool.

Further, at 506, an indication can be output based on the parameter of the device determined to fail to conform to the defined setting (e.g., via the denial component 206 and/or the interface component 106). For example, at 508, an acknowledgement request associated with the differences between the parameter and the defined setting can be sent (e.g., via the denial component 206 and/or the interface component 106). Further, a determination can be made, at 510 whether a response to the acknowledgement request was received (e.g., via the interface component 106).

If a positive response is received (e.g., a positive response to the determination at 510), at 512, addition of the device to the device pool can be allowed (e.g., via the device manager component 104). For example, the response can be a confirmation that the differences are accepted. Alternatively, if a negative response (or no response) is receive, at 514, addition of the device to the device pool can be denied (e.g., via the device manager component 510).

Figure 6:
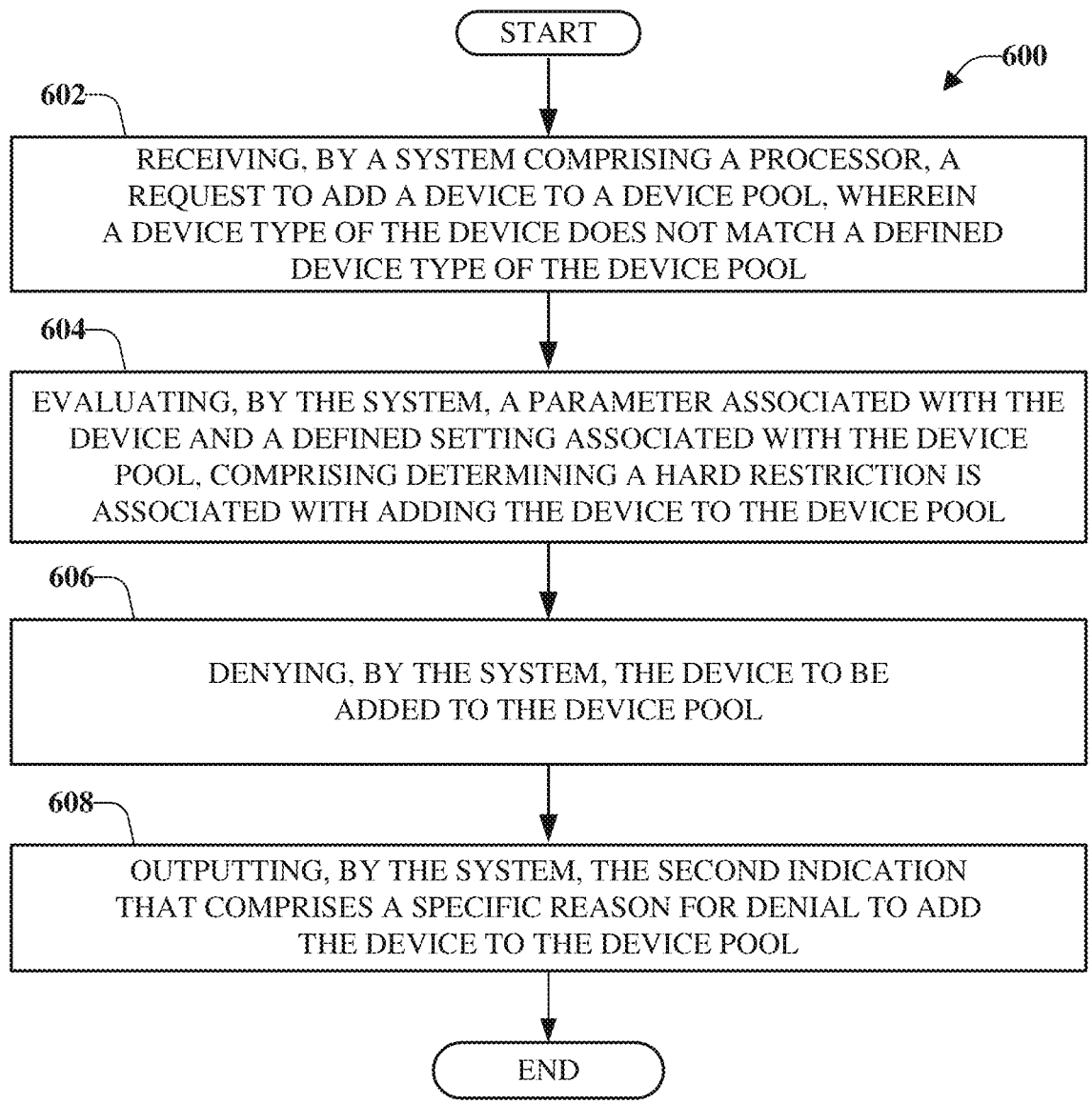
FIG. 6 illustrates a flow diagram of an example, non-limiting, computer-implemented method that facilitates implementation of a high-level restriction related to device compatibility in accordance with one or more embodiments described herein.

FIG. 6 illustrates a flow diagram of an example, non-limiting, computer-implemented method 600 that facilitates implementation of a high-level restriction related to device compatibility in accordance with one or more embodiments described herein. Repetitive description of like elements employed in other embodiments described herein is omitted for sake of brevity.

At 602, at least one request to add a device to a device pool can be received (e.g., via the interface component 106). The request can be, for example, to add a device that has a device type which does not match a defined device type of the device pool. At 604, a parameter associated with the device and a defined setting associated with the device pool can be evaluated (e.g., via the device manager component 104). The evaluation can comprise determining a low-level restriction is associated with adding the device to the device pool.

Addition of the device to the device pool can be denied, at 606 (e.g., via the device manager component 104). Further, at 608, an indication that comprises a specific reason for denial to add the device to the device pool can be output (e.g., via the interface component 106).

Figure 7:
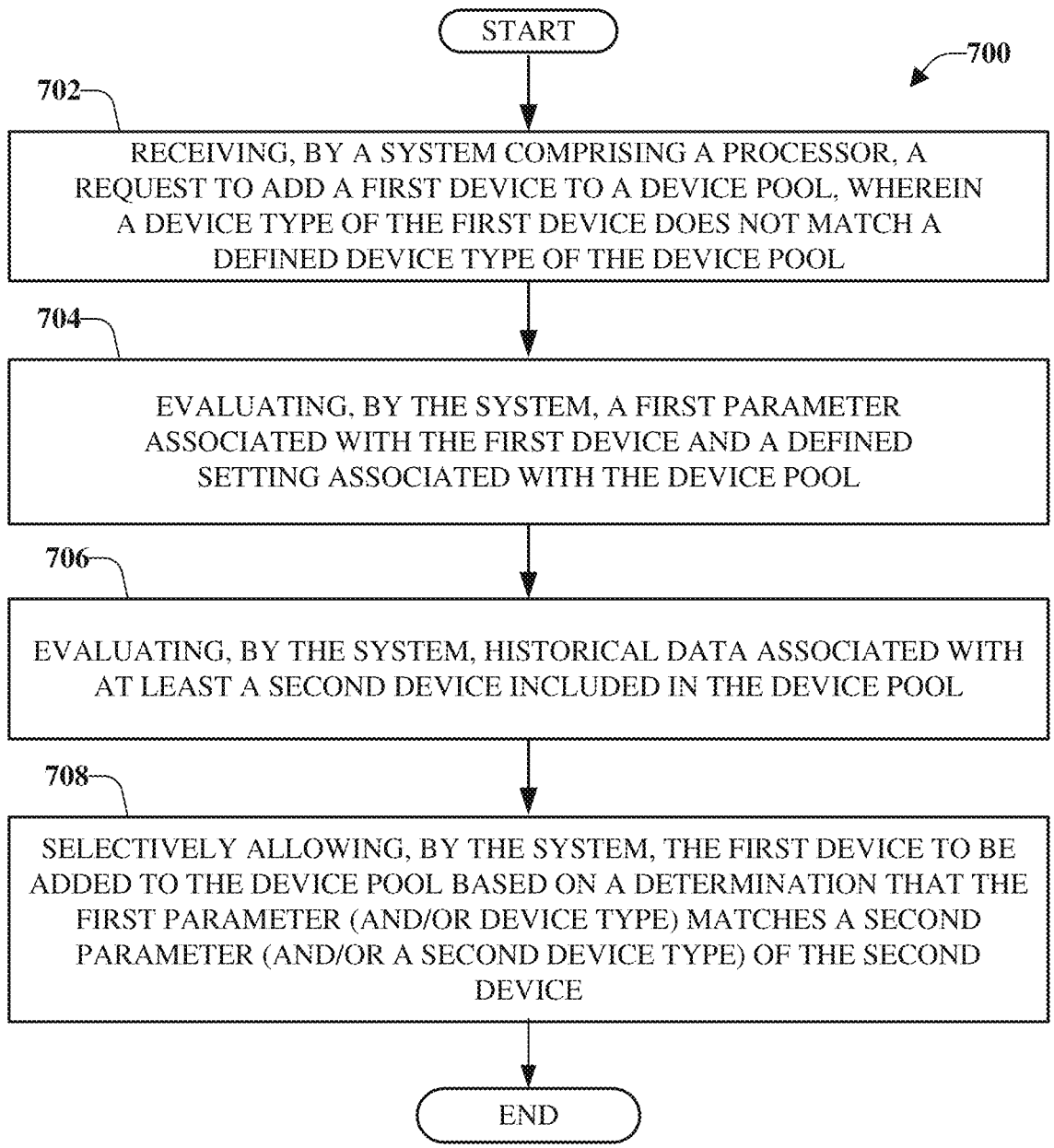
FIG. 7 illustrates a flow diagram of an example, non-limiting, computer-implemented method that facilitates device compatibility based on historic information in accordance with one or more embodiments described herein.

FIG. 7 illustrates a flow diagram of an example, non-limiting, computer-implemented method 700 that facilitates device compatibility based on historic information in accordance with one or more embodiments described herein. Repetitive description of like elements employed in other embodiments described herein is omitted for sake of brevity.

At 702, a request to add a first device to a device pool can be received (e.g., via the interface component 106). The request can be, for example, to add a first device that has a device type which does not match a defined device type of the device pool. At 704, a first parameter associated with the first device and a defined setting associated with the device pool can be evaluated (e.g., via the analysis component 102).

At 706, historical data associated with at least a second device included in the device pool can be evaluated (e.g., via the device manager component 104). Based on the evaluation, at 708, the first device can be selectively allowed to be added to the device pool based on a determination that the first parameter matches a second parameter of the second device. In another example, at 708, the first device can be selectively allowed to be added to the device pool based on a determination that the first device type matches a second device type of the second device (e.g., via the device manager component 104).

Figure 8:
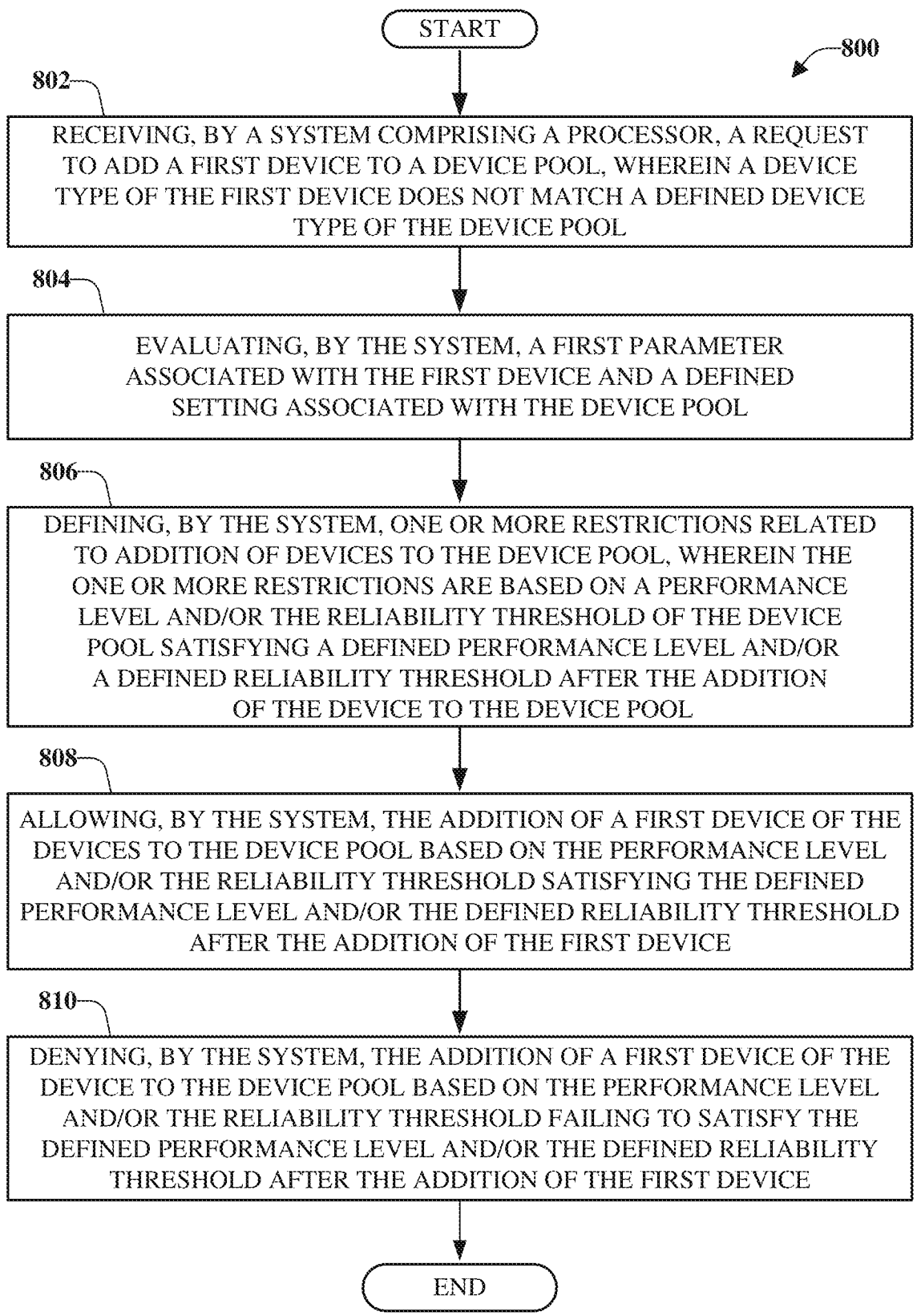
FIG. 8 illustrates a flow diagram of an example, non-limiting, computer-implemented method that facilitates device compatibility based on a performance level and/or a reliability threshold in accordance with one or more embodiments described herein.

FIG. 8 illustrates a flow diagram of an example, non-limiting, computer-implemented method 800 that facilitates device compatibility based on a performance level and/or a reliability threshold in accordance with one or more embodiments described herein. Repetitive description of like elements employed in other embodiments described herein is omitted for sake of brevity.

At 802, a request to add a first device to a device pool can be received (e.g., via the interface component 106). The request can be, for example, to add a first device that has a device type which does not match a defined device type of the device pool. At 804, a first parameter associated with the first device and a defined setting associated with the device pool can be evaluated (e.g., via the analysis component 102).

At 806, one or more restrictions related to addition of devices to the device pool can be defined (e.g., via the definition component 202). The one or more restrictions can be based on a performance level and/or a reliability threshold of the device pool satisfying a defined performance level after the addition of the devices to the device pool.

The addition of a first device of the devices to the device pool can be selectively allowed, at 808, based on the performance level and/or the reliability threshold satisfying the defined performance level after the addition of the first device (e.g., via the device manager component 104). Alternatively, the addition of the first device of the devices to the device pool can be denied based on the performance level and/or the reliability threshold failing to satisfy the defined performance level and/or the defined reliability threshold after the addition of the second device.

Figure 9:
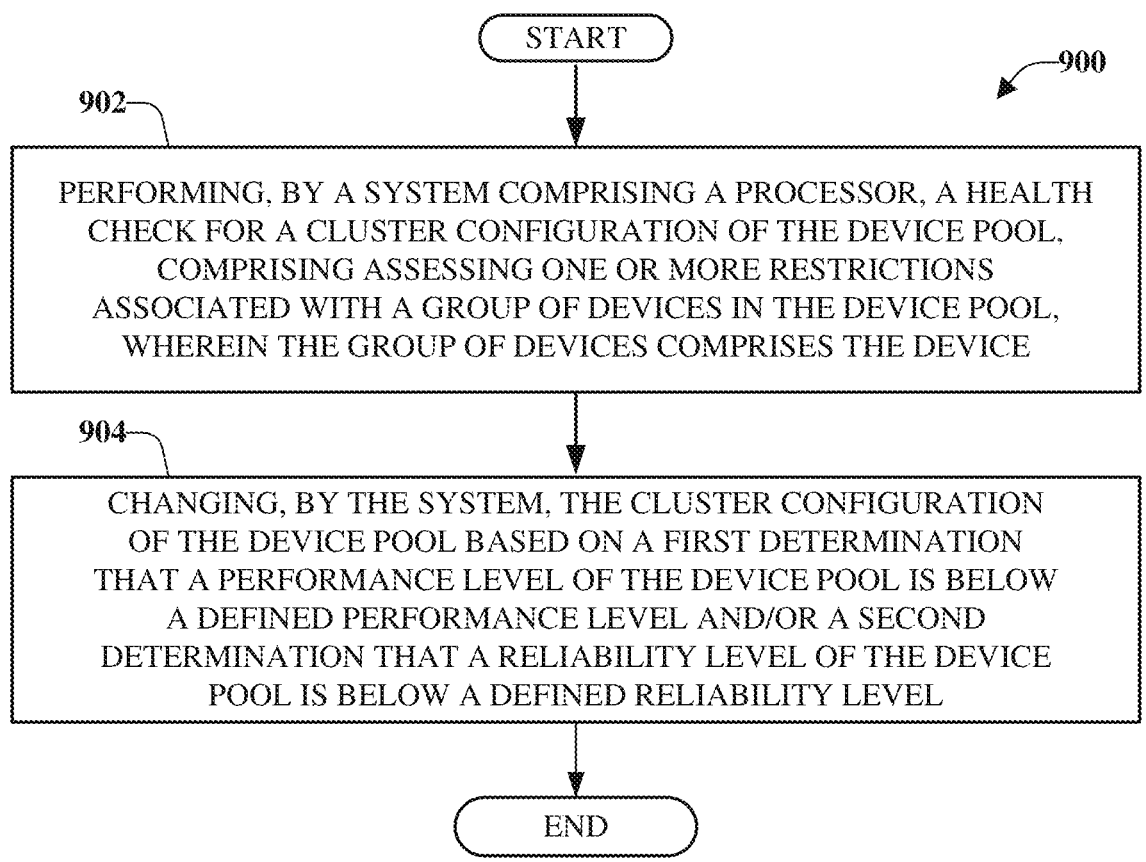
FIG. 9 illustrates a flow diagram of an example, non-limiting, computer-implemented method that facilitates device compatibility based on monitoring a health status of a device pool in accordance with one or more embodiments described herein.

FIG. 9 illustrates a flow diagram of an example, non-limiting, computer-implemented method 900 that facilitates device compatibility based on monitoring a health status of a device pool in accordance with one or more embodiments described herein. Repetitive description of like elements employed in other embodiments described herein is omitted for sake of brevity.

At 902, a health check for a cluster configuration of a device pool can be performed (e.g., via the monitor component 208). The health check can comprise assessing one or more restrictions associated with a group of devices in the device pool.

The cluster configuration of the device pool can be changed, at 904, based on a first determination that a performance level of the device pool is below a defined performance level and/or a second determination that a reliability level of the device pool is below a defined reliability level (e.g., via the modification component 210). In an example, changing the cluster configuration can comprise moving at least one device from the device pool to another device pool.

Figure 10:
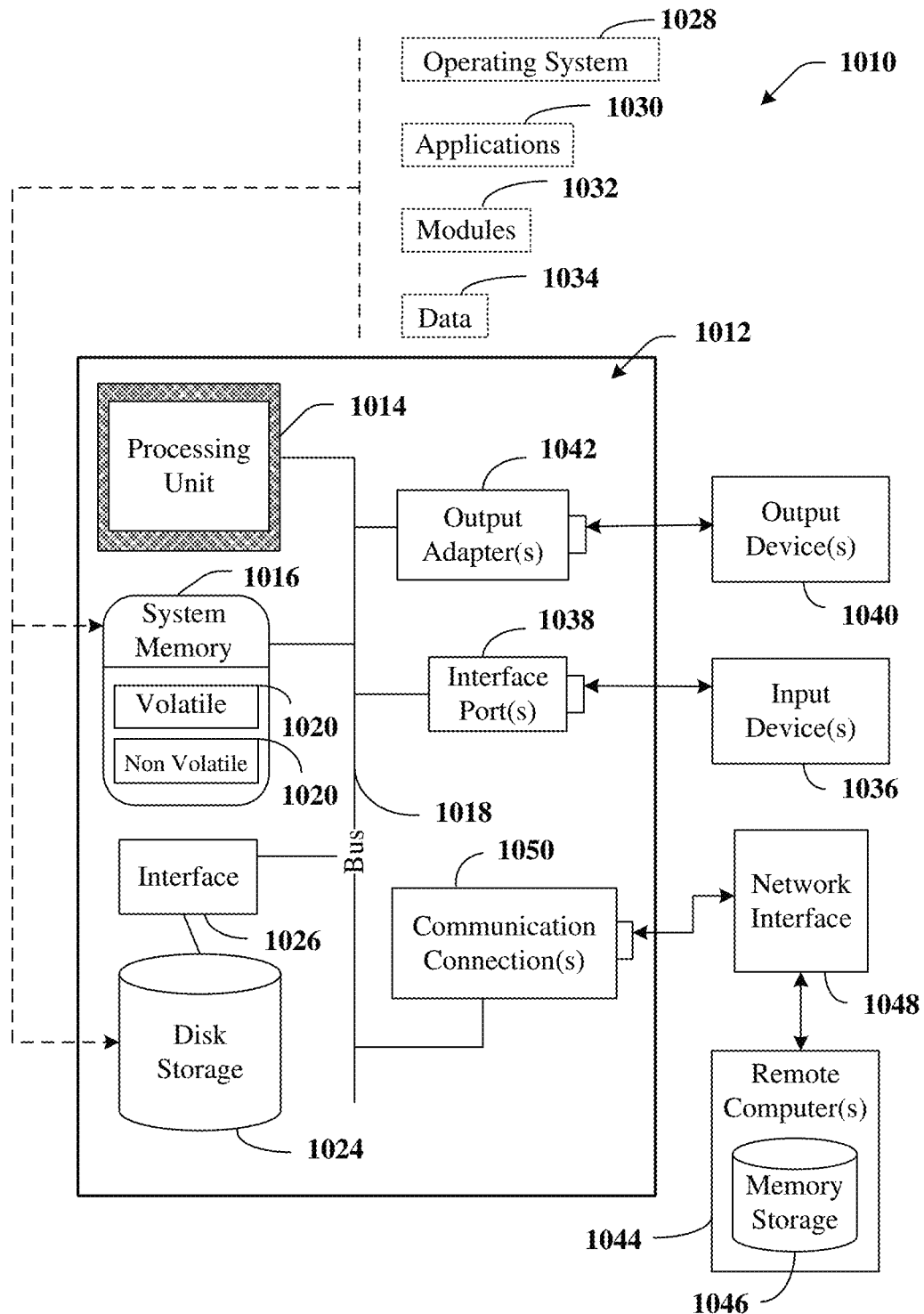
FIG. 10 illustrates an example, non-limiting, computing environment in which one or more embodiments described herein can be facilitated.

In order to provide a context for the various aspects of the disclosed subject matter, FIG. 10 as well as the following discussion are intended to provide a brief, general description of a suitable environment in which the various aspects of the disclosed subject matter can be implemented.

With reference to FIG. 10, an example environment 1010 for implementing various aspects of the aforementioned subject matter comprises a computer 1012. The computer 1012 comprises a processing unit 1014, a system memory 1016, and a system bus 1018. The system bus 1018 couples system components including, but not limited to, the system memory 1016 to the processing unit 1014. The processing unit 1014 can be any of various available processors. Multi-core microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1016 comprises volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can comprise read only memory (ROM), programmable ROM (PROM), electrically programmable ROM (EPROM), electrically erasable PROM (EEPROM), or flash memory. Volatile memory 1020 comprises random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also comprises removable/non-removable, volatile/non-volatile computer storage media. FIG. 10 illustrates, for example a disk storage 1024. Disk storage 1024 comprises, but is not limited to, devices like a magnetic disk drive, floppy disk drive, tape drive, Jaz drive, Zip drive, LS-100 drive, flash memory card, or memory stick. In addition, disk storage 1024 can comprise storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software comprises an operating system 1028. Operating system 1028, which can be stored on disk storage 1024, acts to control and allocate resources of the computer 1012. System applications 1030 take advantage of the management of resources by operating system 1028 through program modules 1032 and program data 1034 stored either in system memory 1016 or on disk storage 1024. It is to be appreciated that one or more embodiments of the subject disclosure can be implemented with various operating systems or combinations of operating systems.

A user enters commands or information into the computer 1012 through input device(s) 1036. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 comprise, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapters 1042 are provided to illustrate that there are some output devices 1040 like monitors, speakers, and printers, among other output devices 1040, which require special adapters. The output adapters 1042 comprise, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically comprises many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies comprise Fiber Distributed Data Interface (FDDI), Copper Distributed Data Interface (CDDI), Ethernet/IEEE 802.3, Token Ring/IEEE 802.5 and the like. WAN technologies comprise, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the system bus 1018. While communication connection 1050 is shown for illustrative clarity inside computer 1012, it can also be external to computer 1012. The hardware/software necessary for connection to the network interface 1048 comprises, for exemplary purposes only, internal and external technologies such as, modems including regular telephone grade modems, cable modems and DSL modems, ISDN adapters, and Ethernet cards.

Figure 11:
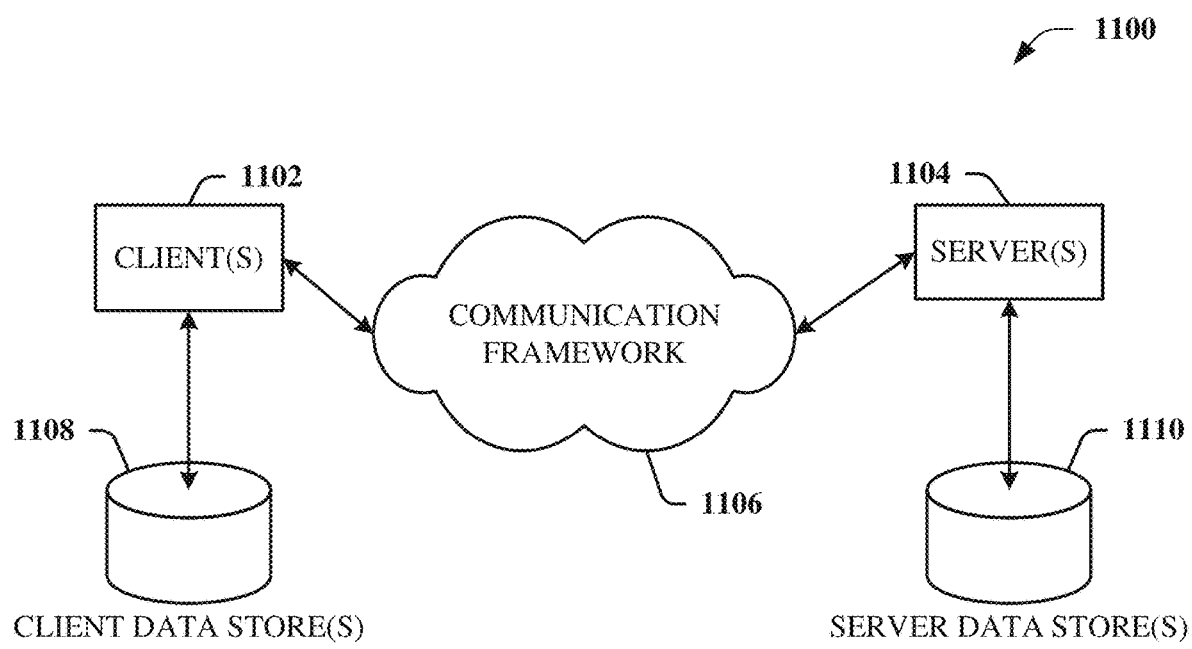
FIG. 11 illustrates an example, non-limiting, networking environment in which one or more embodiments described herein can be facilitated.

FIG. 11 is a schematic block diagram of a sample computing environment 1100 with which the disclosed subject matter can interact. The sample computing environment 1100 includes one or more client(s) 1102. The client(s) 1102 can be hardware and/or software (e.g., threads, processes, computing devices). The sample computing environment 1100 also includes one or more server(s) 1104. The server(s) 1104 can also be hardware and/or software (e.g., threads, processes, computing devices). The servers 1104 can house threads to perform transformations by employing one or more embodiments as described herein, for example. One possible communication between a client 1102 and servers 1104 can be in the form of a data packet adapted to be transmitted between two or more computer processes. The sample computing environment 1100 includes a communication framework 1106 that can be employed to facilitate communications between the client(s) 1102 and the server(s) 1104. The client(s) 1102 are operably connected to one or more client data store(s) 1108 that can be employed to store information local to the client(s) 1102. Similarly, the server(s) 1104 are operably connected to one or more server data store(s) 1110 that can be employed to store information local to the servers 1104.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," "manager," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable storage media can comprise, but are not limited to, radon access memory (RAM), read only memory (ROM), electrically erasable programmable read only memory (EEPROM), flash memory or other memory technology, solid state drive (SSD) or other solid-state storage technology, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

As used herein, the term "storage device," "first storage device," "storage system," and the like, can include, for example, private or public cloud computing systems for storing data as well as systems for storing data comprising virtual infrastructure and those not comprising virtual infrastructure. The term "I/O request" (or simply "I/O") can refer to a request to read and/or write data.

The term "cloud" as used herein can refer to a cluster of nodes (e.g., set of network servers), for example, within a distributed object storage system, that are communicatively and/or operatively coupled to one another, and that host a set of applications utilized for servicing user requests. In general, the cloud computing resources can communicate with user devices via most any wired and/or wireless communication network to provide access to services that are based in the cloud and not stored locally (e.g., on the user device). A typical cloud-computing environment can include multiple layers, aggregated together, that interact with one another to provide resources for end-users.

Further, the term "storage device" can refer to any Non-Volatile Memory (NVM) device, including Hard Disk Drives (HDDs), flash devices (e.g., NAND flash devices), and next generation NVM devices, any of which can be accessed locally and/or remotely (e.g., via a Storage Attached Network (SAN)). In some embodiments, the term "storage device" can also refer to a storage array comprising one or more storage devices. In various embodiments, the term "object" refers to an arbitrary-sized collection of user data that can be stored across one or more storage devices and accessed using I/O requests.

As utilized herein an "entity," "client," "user," and/or "application" can refer to any system or person that can send I/O requests to a storage system. For example, an entity, can be one or more computers, the Internet, one or more systems, one or more commercial enterprises, one or more computers, one or more computer programs, one or more machines, machinery, one or more actors, one or more users, one or more customers, one or more humans, and so forth, hereinafter referred to as an entity or entities depending on the context.

Disclosed embodiments and/or aspects should neither be presumed to be exclusive of other disclosed embodiments and/or aspects, nor should a device and/or structure be presumed to be exclusive to its depicted element in an example embodiment or embodiments of this disclosure, unless where clear from context to the contrary. The scope of the disclosure is generally intended to encompass modifications of depicted embodiments with additions from other depicted embodiments, where suitable, interoperability among or between depicted embodiments, where suitable, as well as addition of a component(s) from one embodiment(s) within another or subtraction of a component(s) from any depicted embodiment, where suitable, aggregation of elements (or embodiments) into a single device achieving aggregate functionality, where suitable, or distribution of functionality of a single device into multiple device, where suitable. In addition, incorporation, combination or modification of devices or elements (e.g., components) depicted herein or modified as stated above with devices, structures, or subsets thereof not explicitly depicted herein but known in the art or made evident to one with ordinary skill in the art through the context disclosed herein are also considered within the scope of the present disclosure.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs., where applicable, it is to be understood that other similar embodiments can be used, or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    receiving, by a system comprising a processor, a request to add a device to an existing device pool of a communication architecture of a parallel distributed networked file system, wherein a device type of the device does not match a defined device type of the existing device pool, wherein the device type is a defined hardware configuration, and wherein the existing device pool comprises a collection of devices that are part of a cluster of the parallel distributed networked file system;
    evaluating, by the system, a parameter associated with the device and a defined setting associated with the existing device pool, wherein the parameter is an amount of memory, and wherein the defined setting is a defined amount of memory; and
    outputting, by the system, via a display of a user equipment and in response to the request to add the device to the existing device pool, one of a group of messages, comprising:
        based on the parameter conforming to the defined setting, a first message that comprises first information related to the parameter conforming to the defined setting, and
        based on the parameter failing to conform to the defined setting, a second message that comprises second information related to the parameter failing to conform to the defined setting.

2. The method of claim 1, wherein the evaluating comprises determining a restriction associated with adding the device to the existing device pool.

3. The method of claim 2, wherein the restriction is a low-level restriction, and wherein the second message comprises an indication of differences between the parameter and the defined setting, and wherein the method further comprises:
    sending, by the system, an acknowledgement request associated with the differences; and
    allowing, by the system, the device to be added to the existing device pool based on a first receipt of a first confirmation in response to the acknowledgement request, or
    denying, by the system, the device to be added to the existing device pool based on a second receipt of a denial of the acknowledgement request, or no response to the acknowledgement request.

4. The method of claim 2, wherein the restriction is a high-level restriction, and wherein the second message comprises an indication of the differences, and wherein the method further comprises:
    denying, by the system, the device to be added to the existing device pool; and
    outputting, by the system, the second message that comprises a specific reason for denial to add the device to the existing device pool.

5. The method of claim 1, wherein the device is a first device, wherein the parameter is a first parameter, and wherein the evaluating the first parameter comprises:
    evaluating historical data associated with at least a second device included in the existing device pool; and
    selectively allowing the first device to be added to the existing device pool based on a determination that the first parameter matches a second parameter of the second device.

6. The method of claim 1, wherein the device is a first device, wherein the device type is a first device type, and wherein the evaluating the parameter comprises:

evaluating historical data associated with at least a second device included in the existing device pool; and selectively allowing the first device to be added to the existing device pool based on a determination that the first device type matches a second device type of the second device.

7. The method of claim 1, further comprising:

defining, by the system, one or more restrictions related to addition of devices to the existing device pool, wherein the one or more restrictions are based on a performance level of the existing device pool satisfying a defined performance level after the addition of the devices to the existing device pool.

8. The method of claim 7, further comprising:

allowing, by the system, the addition of a first device of the devices to the existing device pool based on the performance level satisfying the defined performance level after the addition of the first device; and denying, by the system, the addition of a second device of the devices to the existing device pool based on the performance level failing to satisfy the defined performance level after the addition of the second device.

9. The method of claim 1, further comprising:

defining, by the system, one or more restrictions related to addition of devices to the existing device pool, wherein the one or more restrictions are based on a reliability threshold of the existing device pool satisfying a defined reliability threshold based on the addition of the devices to the existing device pool.

10. The method of claim 9, further comprising:

allowing, by the system, the addition of a first device of the devices to the existing device pool based on the reliability threshold satisfying the defined reliability threshold after the addition of the first device; and denying, by the system, the addition of a second device of the devices to the existing device pool based on the reliability threshold failing to satisfy the defined reliability threshold after the addition of the second device.

11. A system, comprising:

a processor; and a memory that stores executable instructions that, when executed by the processor, facilitate performance of operations, comprising:

receiving a request to add a device to a device pool of a parallel distributed network object storage system;

evaluating, a parameter of the device to a defined parameter of devices already included in the device pool based on receipt of the request to add the device to the device pool and based on a determination that a device type of the device does not match a defined device type of the device pool, wherein the parameter is an amount of memory, wherein the defined parameter is a defined amount of memory, wherein the device pool is a collection of devices that are part peel of a cluster of the parallel distributed network object storage system, and wherein the defined device type is a hardware profile; and performing one of:

allowing the device to be included in the device pool based on the evaluating, or denying the device to be included in the device pool based on the evaluating, and providing information indicative of a denial to add the device to the device pool and an opportunity for the denial to be overridden based on receipt of an approval confirmation.

12. The system of claim 11, wherein the providing the information indicative of the denial comprises providing the information at a defined level of specificity.

13. The system of claim 11, wherein the operations further comprise:

performing a health check for a cluster configuration of the device pool, comprising assessing one or more restrictions associated with a group of devices in the device pool, wherein the group of devices comprises the device; and changing the cluster configuration of the device pool based on a first determination that a performance level of the device pool is below a defined performance level or a second determination that a reliability level of the device pool is below a defined reliability level.

14. The system of claim 13, wherein the device pool is a first device pool, and wherein the changing the cluster configuration of the device pool comprises moving one or more devices of the group of devices to a second device pool.

15. The system of claim 11, wherein the determination is a first determination, and wherein the operations further comprise:

performing a health check for a cluster configuration of the device pool, comprising assessing one or more restrictions associated with a group of devices in the device pool, wherein the group of devices comprises the device; and outputting an alert and an action to be performed to correct the cluster configuration based on a second determination that a reliability of the cluster configuration has fallen below a defined reliability level or that a performance of the cluster configuration has fallen blow a defined performance level.

16. The system of claim 11, wherein the determination is a first determination, wherein the device is a first device, wherein the parameter is a first parameter, and wherein the operations further comprise:

evaluating historical data associated with at least a second device included in the device pool; and selectively allowing the first device to be added to the device pool based on a second determination that the first parameter matches a second parameter of the second device.

17. The system of claim 11, wherein the operations further comprise:

defining one or more restrictions related to addition of devices to the device pool, wherein the one or more restrictions are based on a performance level of the device pool satisfying a defined performance level based on the addition of the devices to the device pool;

allowing the addition of a first device of the devices to the device pool based on the performance level satisfying the defined performance level after the addition of the first device; and denying the addition of a second device of the devices to the device pool based on the performance level failing to satisfy the defined performance level after the addition of the second device.

18. A non-transitory computer-readable medium comprising instructions that, in response to execution, cause a system comprising a processor to perform operations, comprising:

receiving a request to add a first device to an existing device pool of a communication architecture of a parallel distributed networked file system, wherein the existing device pool comprises a second device, wherein a first device type of the first device does not match a second device type of the second device, wherein the first device type and the second device type are hardware configurations;

comparing a first parameter associated with the first device with a second parameter associated with the second device, wherein the device pool comprises a collection of devices that are part of a cluster of a parallel distributed network file system, wherein the first parameter is a first amount of memory of the first device, and wherein the second parameter is a second amount of memory of the second device;

performing one of:
- allowing the first device to be added to the device pool based on the first parameter matching the second parameter, or
- denying the first device to be added to the device pool based on the first parameter failing to match the second parameter, and
- providing a message of denial in response to a request for the first device to be added to the device pool, wherein the message of denial comprises specific details related to the denying, wherein the message of denial is capable of being overwritten via receipt of an approval confirmation.

19. The non-transitory computer-readable medium of claim 18, wherein the operations further comprise:

defining one or more restrictions related to addition of devices to the device pool, wherein the one or more restrictions are based on a performance level of the device pool continuing to satisfy a defined performance level after addition of the first device, or based on a reliability level of the device pool continuing to satisfy a defined reliability level after addition of the first device.

20. The non-transitory computer-readable medium of claim 19, wherein the one or more restrictions comprise a low-level restriction and a high-level restriction, and wherein the addition of the first device to the device pool is allowed after acknowledgement of the low-level restriction, and wherein the addition of the first device to the device pool is not allowed based on the high-level restriction.

* * * * *